(12) United States Patent
Tomida

(10) Patent No.: US 7,650,812 B2
(45) Date of Patent: Jan. 26, 2010

(54) SHIFT LEVER

(75) Inventor: Shigetoshi Tomida, Aichi (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 633 days.

(21) Appl. No.: 11/197,326

(22) Filed: Aug. 5, 2005

(65) Prior Publication Data
US 2006/0053929 A1 Mar. 16, 2006

(30) Foreign Application Priority Data
Aug. 10, 2004 (JP) ............................. 2004-233499

(51) Int. Cl.
*G05G 1/00* (2006.01)
(52) U.S. Cl. .................................. 74/473.13
(58) Field of Classification Search ............... 74/473.1, 74/473.21, 473.3, 473.33, 473.36, 491, 519, 74/523, 526, 529, 537, 538
See application file for complete search history.

(56) References Cited

U.S. PATENT DOCUMENTS

| 4,774,850 A | * | 10/1988 | Shovlin ................... 74/473.23 |
| 5,575,174 A | * | 11/1996 | Kanematsu et al. ...... 74/473.23 |
| 5,617,760 A | | 4/1997 | Woeste et al. |
| 6,732,608 B2 | * | 5/2004 | Suzuki ...................... 74/473.3 |
| 7,360,469 B2 | * | 4/2008 | Tomida ........................ 74/537 |
| 2008/0022802 A1 | * | 1/2008 | Sumi et al. ............... 74/473.21 |

FOREIGN PATENT DOCUMENTS

| JP | 59-138915 U | 9/1984 |
| JP | 11-151944 | 6/1999 |
| JP | 2001-294055 A | 10/2001 |
| JP | 2002-002321 | 1/2002 |

OTHER PUBLICATIONS

Office Action dated Sep. 1, 2009 issued by the Japanese Patent Office in corresponding Japanese Patent Application No. 2004-233499.

* cited by examiner

*Primary Examiner*—Vicky A Johnson
(74) *Attorney, Agent, or Firm*—Roberts Mlotkowski Safran & Cole, P.C.; Thomas W. Cole

(57) ABSTRACT

A shift lever has a detent rod which is movable along a longitudinal direction of a lever main body. A knob, which is graspably mounted to a distal end portion of the shift lever, has an attachment hole, and a holder is attached in the attachment hole. The holder has a button which is reciprocatingly movable into and out of the attachment hole, and a link which is interlocked with movement of the button. When the button is moved inwardly, the link abuts the detent rod, and moves the detent rod along the longitudinal direction of the lever main body. When the link moves reciprocatingly at the inner side of the knob, the link abuts the inner side of the knob. Elastic members which elastically deform are provided at the link and at a region of the inner side of the knob which region is abutted by the link.

14 Claims, 7 Drawing Sheets

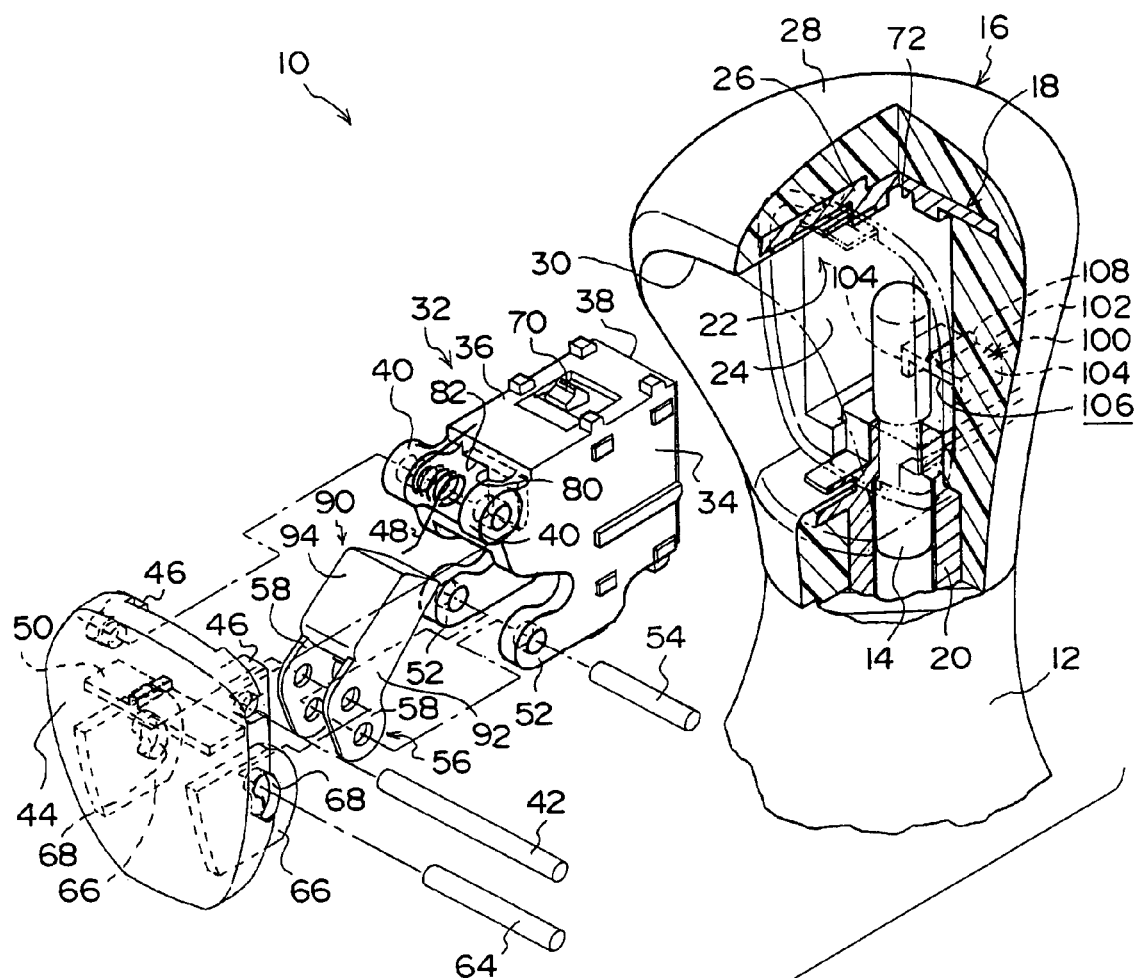
F I G. 1

SHIFT LEVER

CROSS-REFERENCE TO RELATED APPLICATION

This application claims priority under 35 USC 119 from Japanese Patent Application No. 2004-233499, the disclosure of which is incorporated by reference herein.

BACKGROUND OF THE INVENTION

1. Field of the Invention

The present invention relates to a shift lever for operating a transmission of a vehicle or the like.

2. Description of the Related Art

A plurality of shift ranges are set in advance in an automatic transmission of a vehicle. An operating device, for selecting and operating these plural shift ranges, is provided in the vehicle. As this type of operation device, there is a so-called "straight-type" shift lever device.

The straight-type shift lever device has a shift lever. The shift lever is supported, at a predetermined region of the longitudinal direction proximal end side thereof, so as to be rotatable around an axis whose axial direction is the substantially left-right direction of the vehicle. The rotational position of the shift lever is detected by a position detecting device such as a microswitch or the like for example. An ECU or the like, which controls the automatic transmission, changes the shift range of the automatic transmission on the basis of the results of detection of the position detecting device.

The shift lever is provided with a detent mechanism for preventing inadvertent movement of the shift lever from, for example, a shift position (hereinafter, called "N position" for convenience) corresponding to a neutral range which cuts-off the transmission of driving force from the engine to the wheels, to a shift position (hereinafter called "R position" for convenience) corresponding to a reverse range which transmits driving force from the engine to the wheels and moves the vehicle rearward.

The detent mechanism has a detent rod. The detent rod is provided at the interior of the shift lever so as to be movable along the longitudinal direction of the shift lever. A detent pin is formed to project from the longitudinal direction proximal end side of the detent rod. The detent pin projects outside of the shift lever, and enters in a detent hole which is formed in a housing of the shift lever device.

When the shift lever is operated by being rotated, together with the shift lever, the detent pin rotates in the detent hole. In the state in which the shift lever has reached the N position, a projection, which is formed at the inner peripheral portion of the detent hole, opposes the rotating direction side of the detent pin at the time when the shift lever rotates to the R position. When an attempt is made to rotate the shift lever to the R position in this state, the projection interferes with the detent pin, and restricts rotation of the detent pin, and accordingly, rotation of the shift lever.

On the other hand, a button is provided at a knob for grasping which is provided at the distal end side of the shift lever. When this button is pushed and operated, the detent rod moves toward the proximal end side of the shift lever. In this way, the detent pin is set in a state in which it can avoid the aforementioned projection, and even when an attempt is made to rotate the shift lever from the N position to the R position, the projection does not interfere with the detent pin, and the shift lever can be rotated from the N position to the R position.

The structure of a shift lever which has such a button is disclosed in Japanese Patent Application Laid-Open (JP-A) No. 11-151944.

In the shift lever disclosed in JP-A No. 11-151944, a knob button is rotatably supported at a supporting shaft which is provided at the inner side of the shift knob in a vicinity of the upper open end of the shift knob (the knob). The opening of a rectilinear, elongated hole is formed at the side of the supporting shaft of the knob button, which side is opposite the side at which a pushing surface is located.

A lever, which is bent in a substantial V-shape, is provided at the inner side of the shift knob. The lever is structured such that a supporting shaft is provided at the bent portion, and so as to be able to rotate around the supporting shaft. A pin is provided at an arm portion at one side of the bent portion of the lever. The pin enters into the aforementioned opening.

On the other hand, one end of a wire, which corresponds to the aforementioned detent rod, is engaged to an arm portion at the other side of the bent portion of the lever.

In this shift lever, when the pushing surface of the knob button is pushed, the knob button rotates around the supporting shaft. When the knob button rotates, the inner wall of the opening pushes up the pin, and rotates the lever around the supporting shaft. The other arm portion of the lever thereby pulls the wire.

In the shift lever disclosed in JP-A No. 11-151944, if a so-called "overstroke" state arises in which the amount of movement at the time when the knob button is pushed is too large, the arm portion at the one side of the bent portion of the lever is interfered with by the inner wall of the shift knob, and further rotation of the lever is restricted. When such interference arises, the rotating arm portion collides with the inner wall of the shift knob. Therefore, an impact noise arises accompanying this collision.

SUMMARY OF THE INVENTION

In view of the aforementioned, an object of the present invention is to provide a shift lever which can effectively prevent or mitigate the generation of impact noise or the like at the time when an operation member moves reciprocatingly.

A first aspect of the present invention is a shift lever comprising: a lever main body which is hollow and which can rotate around one of a longitudinal direction intermediate portion thereof and a proximal end side thereof; a moving body provided within the lever main body so as to be movable along a longitudinal direction of the lever main body; a knob graspably mounted to a distal end portion of the lever main body, an attachment hole, which communicates with an interior of the lever main body, being formed in the knob; an operation member at least a portion of which is mounted one of directly and indirectly to the knob so as to be reciprocatingly movable at an inner side of the attachment hole, and due to the operation member moving in a going direction toward an inner side of the knob, the operation member abuts the moving body and moves the moving body toward a longitudinal direction proximal end side of the lever main body, and due to the operation member moving a predetermined amount in at least one direction of the reciprocal movement, a predetermined region of the knob interferes with the operation member such that movement of the operation member in that moving direction is restricted; and an elastic member provided at at least one of the operation member and the predetermined region, and in a state in which the predetermined region interferes with the operation member, the elastic member exists between the operation member and the predetermined region and elastically deforms.

BRIEF DESCRIPTION OF THE DRAWINGS

FIG. 1 is an exploded perspective view of a vicinity of a knob of a shift lever relating to an embodiment of the present invention.

FIG. 2 is a perspective view of the vicinity of the knob of the shift lever, with a holder and a button omitted in order to show the structure of the inner side of an attachment hole and the like.

DETAILED DESCRIPTION OF THE INVENTION

<Structure Of The Present Embodiment>

The structure of main portions of a shift lever 10 relating to an embodiment of the present invention is shown in perspective view in FIG. 1. The structure of main portions of the shift lever 10 is shown in sectional view in FIG. 4.

As shown in these drawings, the shift lever 10 has a lever main body 12. The lever main body 12 is formed in the shape of a tube whose interior is hollow, of a synthetic resin material or a metal material.

Although not illustrated in detail, the proximal end side (lower side in FIG. 4) of the lever main body 12 is disposed in a housing which is substantially shaped as a box and is mounted to a vehicle body for example. The lever main body 12 is supported so as to be rotatable around a shaft whose axial direction is, for example, the substantially left-right direction of the vehicle, by a shaft whose both ends are supported at side walls of the housing.

Figure 4:
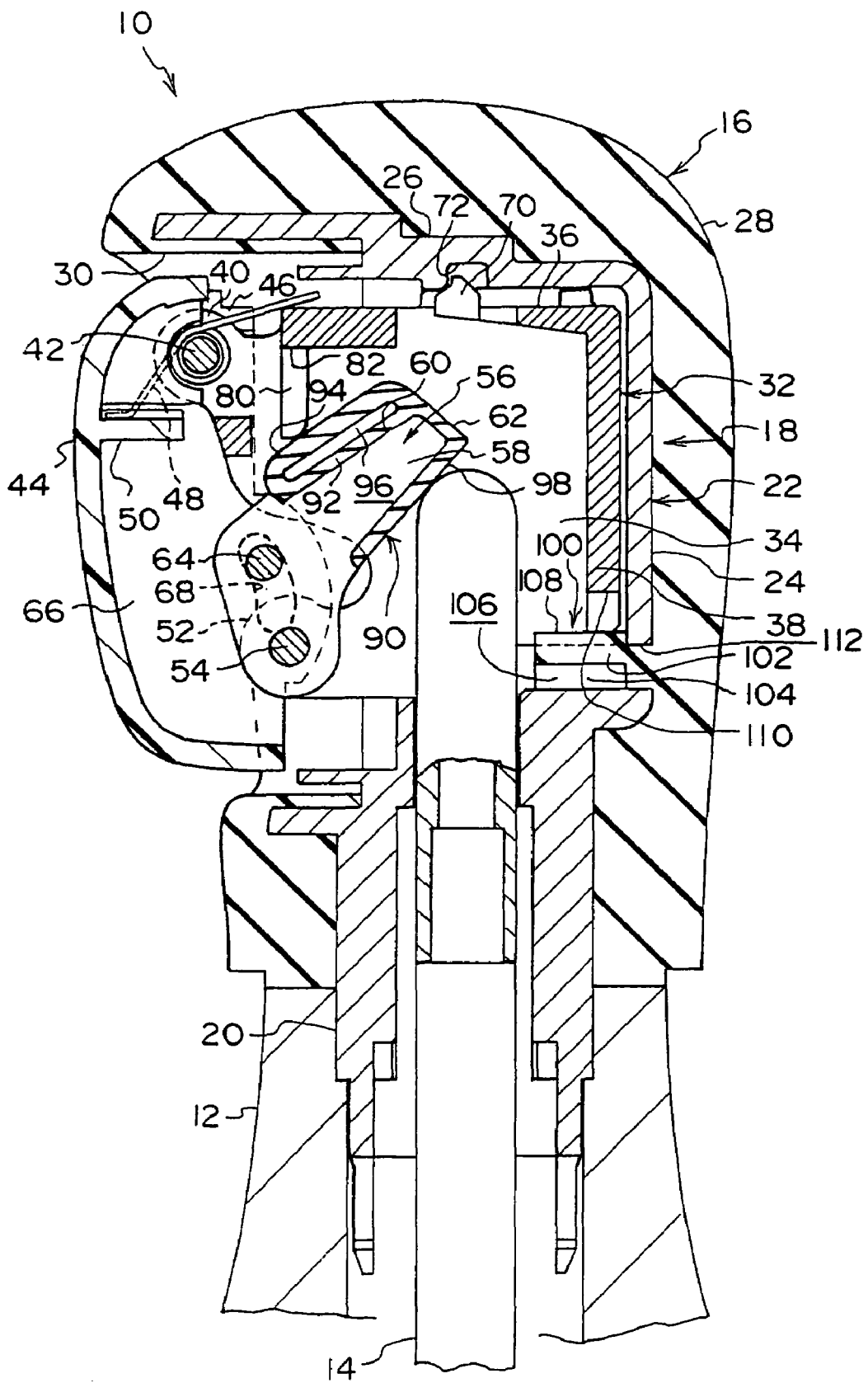
FIG. 4 is a sectional view of main portions of the shift lever relating to the embodiment of the present invention.

Further, as shown in FIGS. 1 and 4, a rod-shaped detent rod 14 serving as a moving body is accommodated within the lever main body 12, so as to be movable along the longitudinal direction of the lever main body 12. One longitudinal direction end portion (the upper end portion in FIG. 4) of the detent rod 14 projects from the end of an opening formed in the distal end portion (the upper end portion in FIG. 4) of the lever main body 12.

Figure 5:
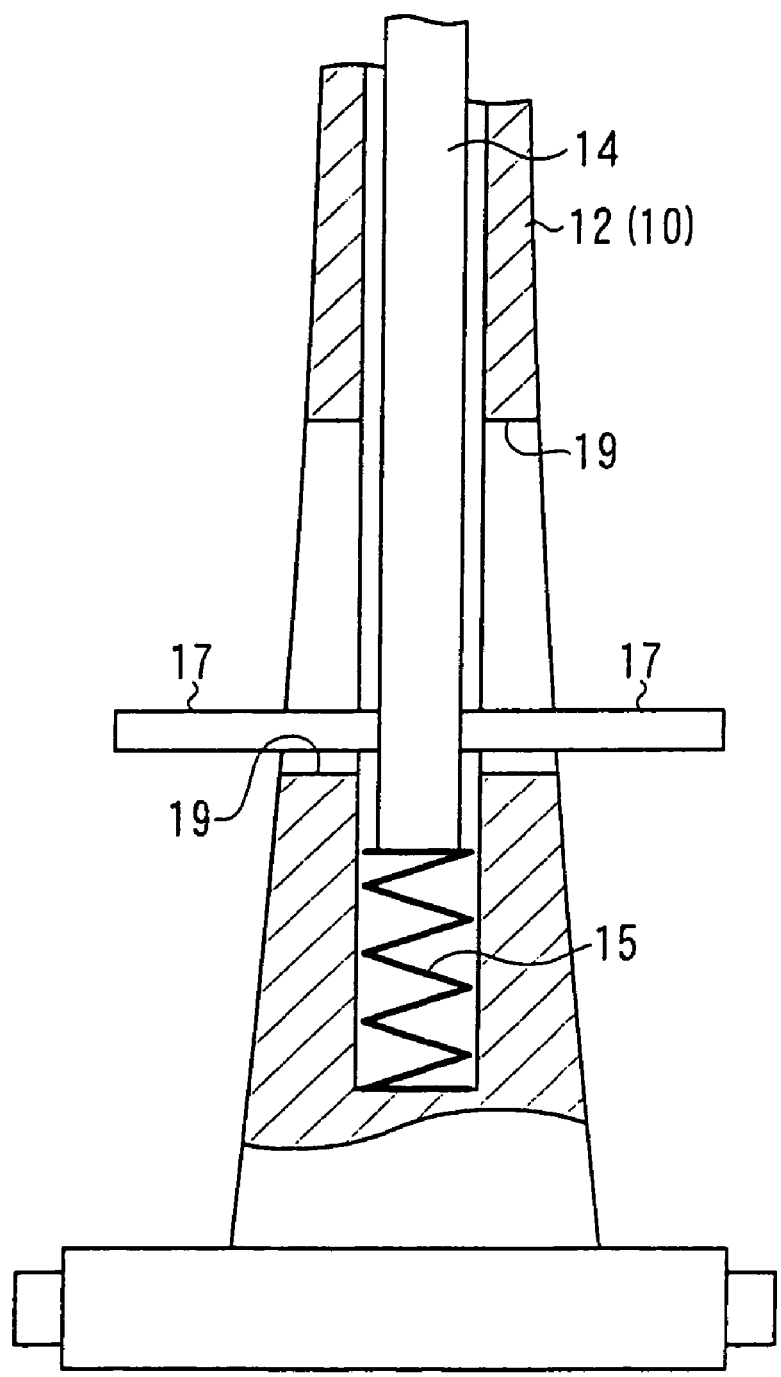
FIG. 5 is a sectional view schematically showing the structure of the proximal end side of a lever main body.

As shown in FIG. 5, the proximal end side of the interior of the lever main body 12 is closed. A compression coil spring 15 serving as a second urging member is disposed between the floor portion of the interior of the lever main body 12 and the detent rod 14. The compression coil spring 15 urges the detent rod 14 toward the distal end side of the lever main body 12 (i.e., upwardly in FIG. 5).

Further, a pair of detent pins 17 are formed to project from the outer peripheral portion of the longitudinal direction proximal end side of the detent rod 14. Slit holes 19, which communicate the interior and the exterior of the lever main body 12, are formed in the outer peripheral portion of the proximal end side of the lever main body 12, so as to correspond to the detent pins 17.

The detent pins 17 pass through the these slit holes 19, and the distal end sides of the detent pins 17 project-out at the outer peripheral portion of the lever main body 12. The slit holes 19 are formed so as to be long along the longitudinal direction of the lever main body 12. In a state of passing through the slit holes 19, the detent pins 17 can move in the longitudinal direction of the slit holes 19, i.e., in the longitudinal direction of the lever main body 12.

Detent holes (not illustrated) are formed in side walls of the aforementioned housing, in correspondence with the distal end sides of the detent pins 17 projecting-out from the slit holes 19. The distal end sides of the detent pins 17 are disposed in the detent holes. Projecting portions (not shown) are formed at predetermined regions of, among the inner peripheral portions of the detent holes, the surfaces which face downward (more specifically, the central sides in the rotational radial direction of the lever main body 12). When the lever main body 12 reaches a predetermined rotational position (shift position), the projecting portions and the detent pins 17 oppose one another along the rotational peripheral direction of the lever main body 12.

In this way, when an attempt is made to rotate the lever main body 12 in the state in which the projecting portions and the detent pins 17 oppose one another, the projecting portions interfere with the detent pins 17. Rotation of the detent pins 17, and accordingly, rotation of the lever main body 12, is thereby restricted.

However, when the detent rod 14 is moved toward the proximal end side of the lever main body 12 against the urging force of the compression coil spring 15, the state in which the detent pins 17 and the projecting portions oppose one another is cancelled. When the lever main body 12 is rotated in this state, the detent pins 17 avoid the projecting portions, and the lever main body 12 can thereby be rotated.

On the other hand, as shown in FIGS. 1 through 4, a knob 16 is provided at the distal end portion of the lever main body 12. The knob 16 has a base 18 which structures a knob main body. The base 18 is formed of metal or a relatively hard synthetic resin material. The base 18 has a tubular portion 20. The tubular portion 20 is formed in the shape of a tube whose both ends are open.

The portion of the tubular portion 20 further toward one end side (the lower side in FIG. 4) than the intermediate portion in the pass-through direction thereof, enters-in into the interior of the lever main body 12 from the open end of the lever main body 12, and is mechanically connected to the lever main body 12. One end side of the detent rod 14 is disposed in the tubular portion 20.

The base 18 has a holding portion 22. The holding portion 22 has a main body 24 which opens toward one side in the direction orthogonal to the pass-through direction (the vertical direction in FIG. 4) of the tubular portion 20. The main body 24 is connected integrally to the other end (the upper end) of the tubular portion 20, except for a predetermined gap. Further, a holding wall 26 is formed continuously with the upper end portion of the main body 24, and the upper end portion of the main body 24 is closed by the holding wall 26.

A cover portion 28 is provided at the outer side of the base 18 which is structured by the tubular portion 20 and the holding portion 22. The cover portion 28 is formed in a configuration which is easy for a vehicle occupant to grasp, of a synthetic resin material which is elastically deformable and softer than the base 18. An attachment hole 30 is formed in the cover portion 28. The attachment hole 30 is open along the direction of opening of the main body 24. A holder 32 is fit and inserted in from the attachment hole 30.

The holder 32 has a pair of side walls 34. The pair of side walls 34 are provided so as to oppose one another along the direction orthogonal to both the pass-through direction of the tubular portion 20 and the aforementioned direction of opening of the main body 24.

The holder 32 has a top wall 36 and a vertical wall 38. The top wall 36 is provided along the top end portions of the pair of side walls 34. The vertical wall 38 is provided along the one end portions which run along the transverse direction of the pair of side walls 34 (the end portions at the side opposite the direction of opening of the main body 24). Due to the top wall 36 and the vertical wall 38, the pair of side walls 34 are connected integrally in a state in which a fixed interval is maintained therebetween.

Supporting pieces 40 are provided in vicinities of the top end portions of the pair of side walls 34 and in a vicinity of the attachment hole 30. A shaft 42 is provided at the supporting pieces 40. One longitudinal direction end side of the shaft 42 passes through one of the supporting pieces 40, and projects out toward the side of the one supporting piece 40 which side is opposite the side at which the other supporting piece 40 is located. The other longitudinal direction end side of the shaft 42 passes through the other supporting piece 40, and projects out toward the side of the other supporting piece 40 which side is opposite the side at which the one supporting piece 40 is located.

A button 44 is mounted to the shaft 42. A pair of mounting pieces 46 are formed in a vicinity of the top end portion of the button 44. The pair of mounting pieces 46 oppose one another along the axial direction of the shaft 42. The end portions of the shaft 42 enter in the pair of supporting pieces 46 at the outer sides of the pair of supporting pieces 40.

In this way, the button 44 is supported by the shaft 42 so as to be rotatable around the shaft 42. Further, a torsion coil spring 48 serving as a first urging member is provided at the shaft 42. One end of the torsion coil spring 48 extends-out at the top surface side of the top wall 36, whereas the other end, by its own urging force, press-contacts the top surface of an engaging piece 50 formed at the button 44. Because the torsion coil spring 48 press-contacts the engaging piece 50 of the button 44 in the state in which the button 44 can rotate around the shaft 42 as described above, the button 44 is urged by the torsion coil spring 48 around the shaft 42 toward the inner side in the direction of opening of the attachment hole 30. Accordingly, a portion of the button 44 enters into the attachment hole 30, if force resisting the urging force of the torsion coil spring 48 is not applied.

On the other hand, supporting pieces 52 are provided in vicinities of the lower end portions of the pair of side walls 34 and in a vicinity of the attachment hole 30. One end portion of a shaft 54 is supported by one of the supporting pieces 52, and the other end portion of the shaft 54 is supported by the other supporting piece 52. The shaft 54 is provided parallel to the shaft 42. A link member 56, which serves as an operation member and is disposed between the pair of side walls 34, is rotatably supported at the shaft 54.

The link member 56 has a pair of side walls 58. The side walls 58 oppose one another along the direction in which the pair of side walls 34 oppose one another. The configurations of the end surfaces of the side walls 58 are bent in substantial V-shapes. The shaft 54 passes through portions of the side walls 58 which are further toward one end sides than the bent portions thereof.

A connecting wall 60 is provided at transverse direction one end portions at the other end sides of the bent portions of the side walls 58. The pair of side walls 58 are integrally connected together by the connecting wall 60 in a state in which a predetermined interval is maintained therebetween. The other end sides of the bent portions of the side walls 58 are covered by a main body portion 92 which serves as an elastic member main body and structures a cover portion 90 which serves as an elastic member.

The main body portion 92 is formed in the shape of a tube which has a floor and whose cross-section is rectangular, of, for example, a rubber material or a synthetic resin material having the same degree of elasticity as a rubber material. The main body portion 92 is attached to the link member 56 in a state in which the both side walls 58 and the connecting wall 60 have entered therein from the open end side thereof.

The cover member 90 has an abutting portion 94. The abutting portion 94 is formed in the shape of a plate which is parallel to the connecting wall 60, of the same material as the main body portion 92. The abutting portion 94 is provided so as to be separated from the main body portion 92 in the direction of thickness of the connecting wall 60. Further, the abutting portion 94 is joined integrally to the main body portion 92 at the outer peripheral portion thereof.

The main body portion 92 and the abutting portion 94 are substantially molded integrally, and a hollow cavity portion 96, which serves as a void portion, is provided between the abutting portion 94 and the main body portion 92.

On the other hand, the wall portion of the main body portion 92 at the side opposite the abutting portion 94 is a pushing portion 98. When the side walls 58 (i.e., the link member 56) rotate in one direction around the shaft 54, the pushing portion 98 abuts the distal end (upper end) of the detent rod 14, and further, the pushing portion 98 pushes the detent rod 14 downward toward the proximal end side of the lever main body 12 against the urging force of the compression coil spring 15.

An abutting portion 100 serving as an elastic member is provided above the top end of the tubular portion 20, so as to correspond to the rotational position of the link member 56 at the time when the pushing portion 98 pushes the detent rod 14 downward by a predetermined stroke toward the proximal end side of the lever main body 12 against the urging force of the compression coil spring 15. The abutting portion 100 is formed of a synthetic resin material which is the same material as the cover portion 28.

Figure 6:
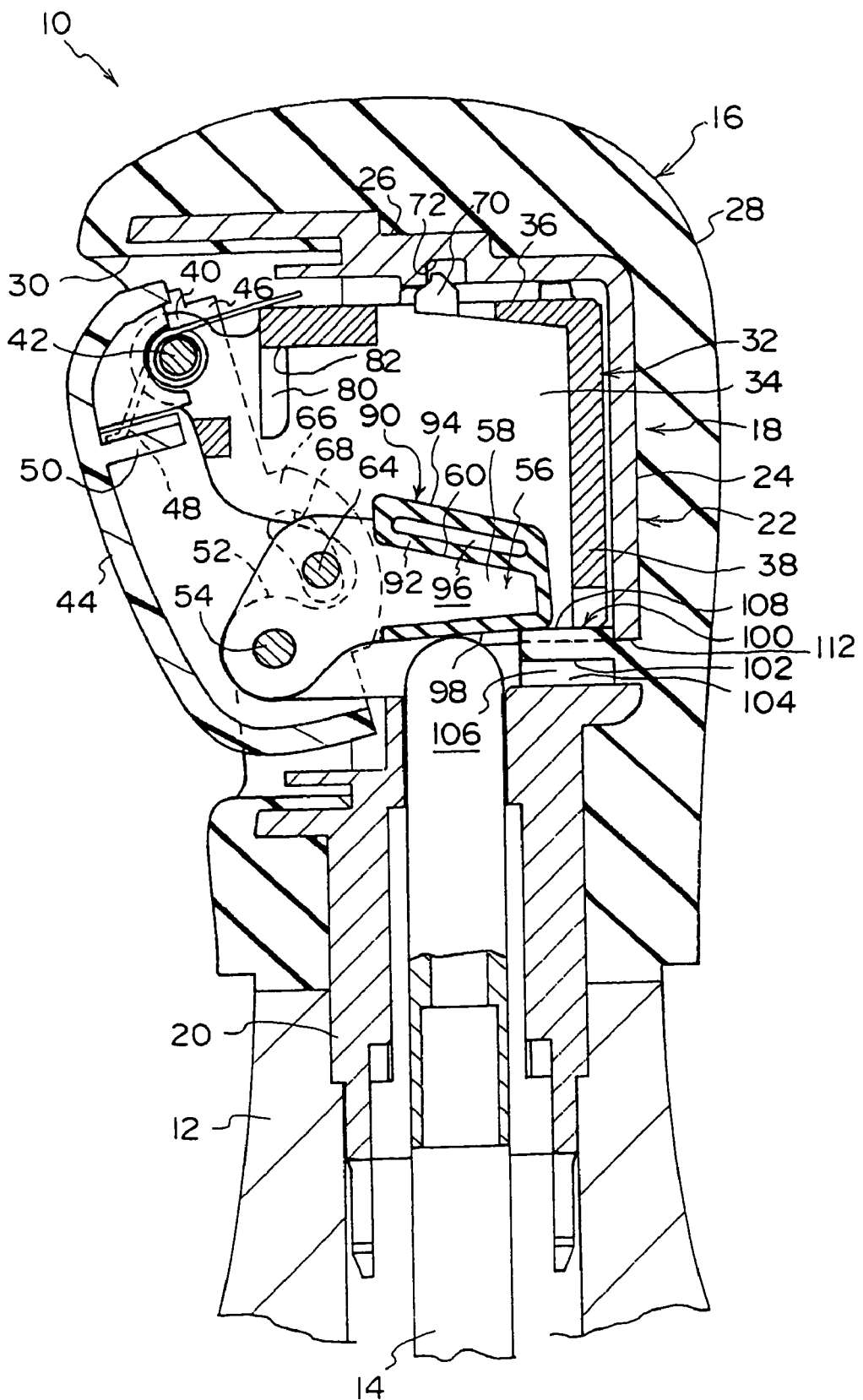
FIG. 6 is a sectional view corresponding to FIG. 4 and showing a state in which an operation member abuts a projecting portion of an elastic member.
Figure 7:
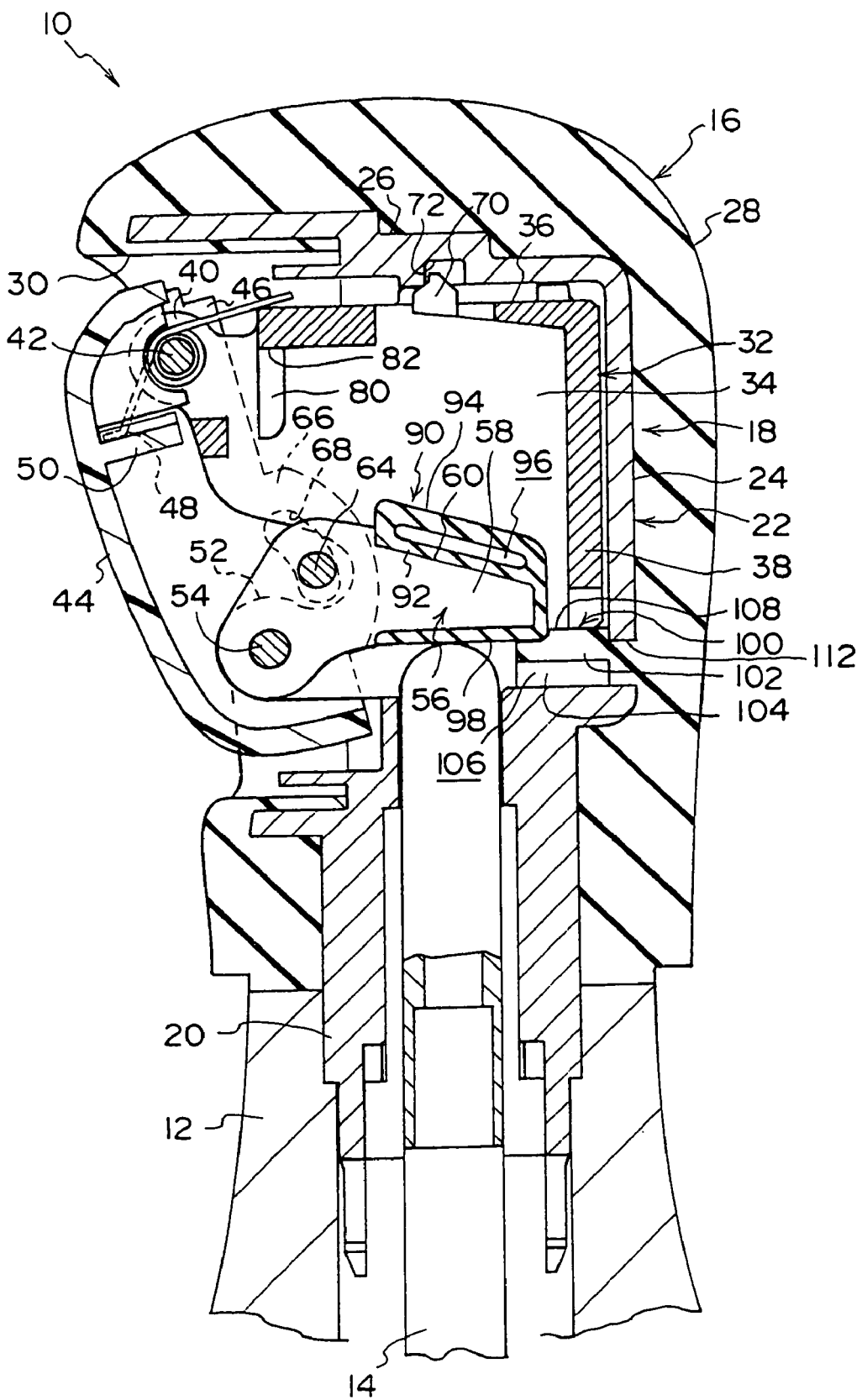
FIG. 7 is a sectional view corresponding to FIG. 4 and showing a state in which the operation member abuts the projecting portion of the elastic member.

As shown in FIGS. 4, 6 and 7, the abutting portion 100 is connected to and extends out from the inner peripheral portion of the cover portion 28, and the cover portion 28 and the abutting portion 100 are substantially molded integrally. The abutting portion 100, which extends out from the cover portion 28, passes through a communicating portion 110, which is formed at the substantial center in the transverse direction of the lower end portion of the vertical wall 38, and a communicating portion 112, which is formed at the substantial center in the direction of the lower end portion of the portion of the main body 24 opposing the vertical wall 38 along the direction of opening of the attachment hole 30, and enters into the interior of the holder 32.

Figure 2:
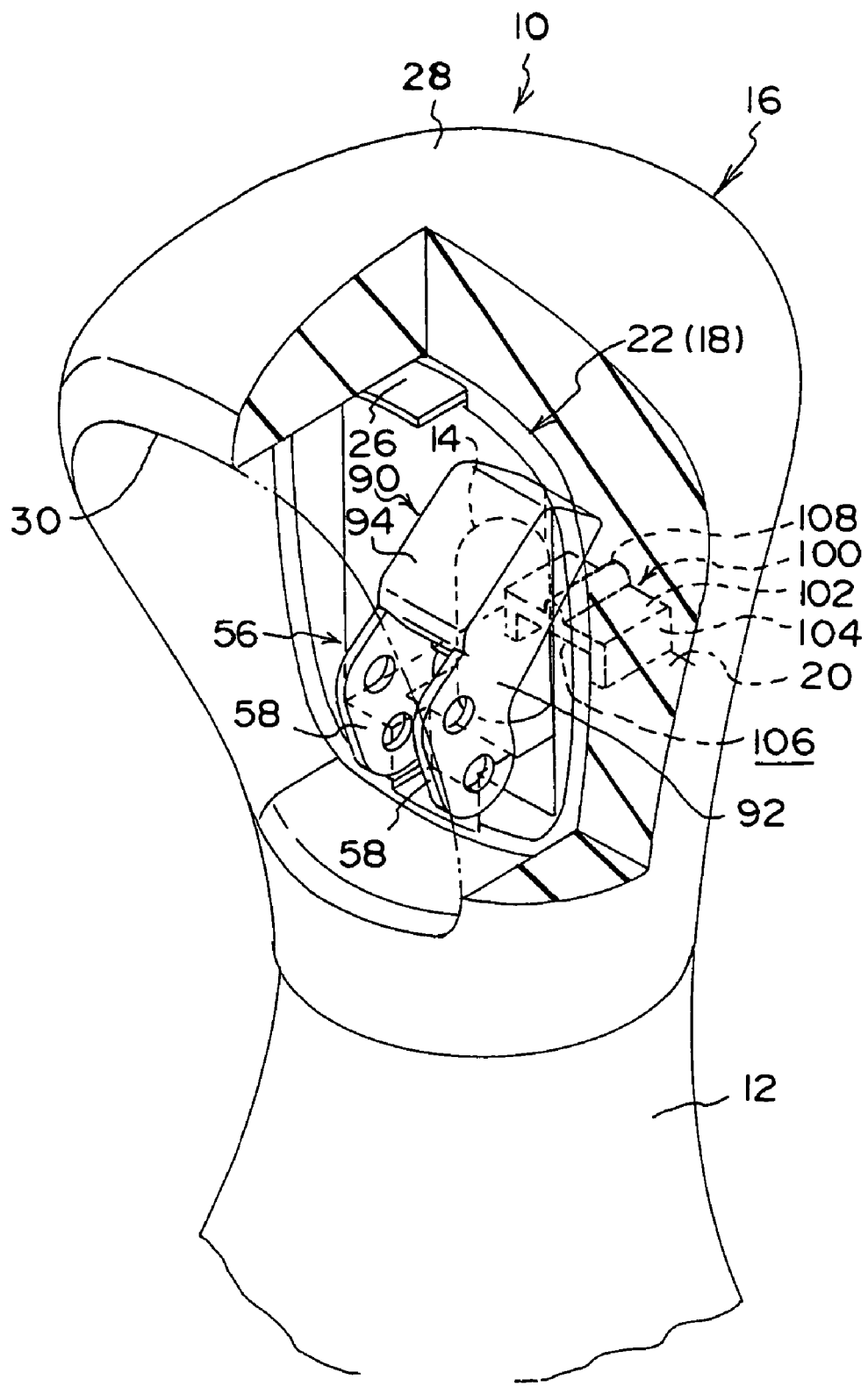
Figure 3:
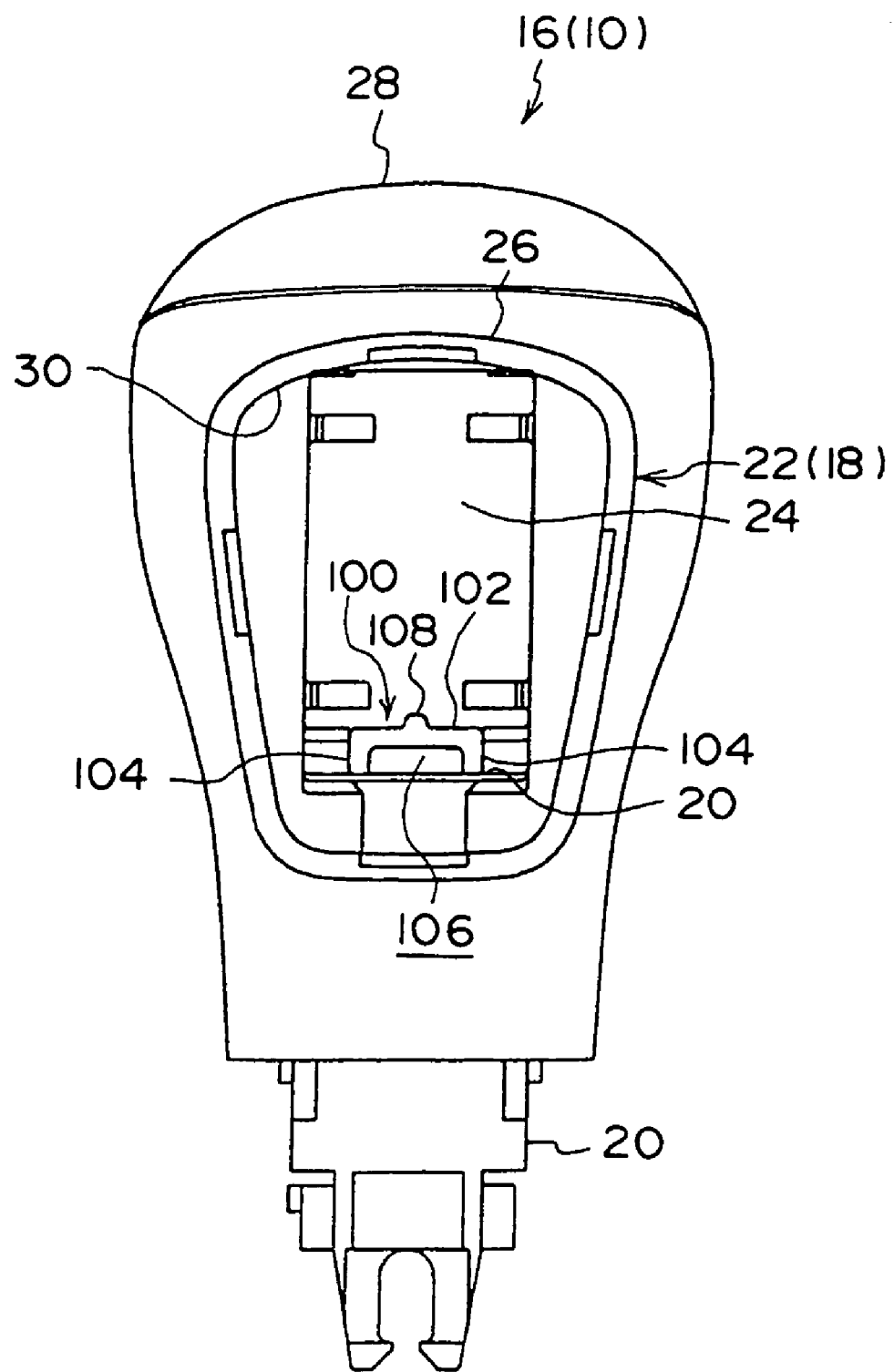
FIG. 3 is a side view of the knob as seen from the open side of the attachment hole.

As shown in FIGS. 2 and 3, the abutting portion 100 has a top wall 102 which serves as an elastic member main body. The top wall 102 is formed in the shape of a flat plate whose direction of thickness is along the direction of opening of the top end opening portion of the tubular portion 20. Vertical walls 104 are formed at the both transverse direction ends of the top wall 102 which run along the direction orthogonal to both the direction of opening of the top end opening portion of the tubular portion 20 and the direction of opening of the attachment hole 30.

The end portions of the vertical walls 104 at the sides opposite the portions joined to the top wall 102, abut the top end of the tubular portion 20, and support the top wall 102 in a state in which the top wall 102 is separated from the top end of the tubular portion 20. Due to the top wall 102 being supported in a state of being separated from the top end of the tubular portion 20 in this way, a void portion 106 is formed between the top wall 102 and the top end of the tubular portion 20.

Further, a projecting portion 108 is formed so as to project toward the side opposite the void portion 106, at the end surface of the upper wall 102 at the side opposite the top end of the tubular portion 20. The dimension of the projecting portion 108 along the transverse direction of the top wall 102 is sufficiently smaller than the top wall 102, and the projecting portion 108 is formed continuously with the top wall 102 along the direction of extension of the top wall 102 from the cover portion 28.

On the other hand, an engaging pin 64, which is parallel to the shafts 42, 54, passes through the bent portions of the side walls 58. A pair of guide walls 66 are formed at the button 44 in correspondence with the engaging pin 64. The pair of guide walls 66 oppose one another along the direction in which the side walls 34, 58 oppose one another.

Guide grooves 68 are formed in the guide walls 66. The inner width dimension of the guide groove 68 is extremely slightly greater than the outer diameter dimension of the engaging pin 64. The end portions of the engaging pin 64, whose both ends project-out at the outer sides of the pair of side walls 58, are disposed in the guide grooves 68. The button 44 and the link member 56 are thereby connected mechanically.

In this way, the engaging pin 64, whose both ends are disposed in the guide grooves 68, is movable relative to the button 44 between the longitudinal direction one ends and other ends of the guide grooves 68. However, relative movement of the engaging pin 64 with respect to the button 44 along the transverse direction of the guide grooves 68 is restricted due to the inner walls of the guide grooves 68 interfering with the engaging pin 64.

Therefore, if the button 44 is rotated around the shaft 42, the inner walls of the guide grooves 68 interfere with the engaging pin 64 and push the engaging pin 64, and rotate the link member 56 around the shaft 54. Further, conversely, if the link member 56 is rotated around the shaft 54, the engaging pin 64 interferes with the inner walls of the guide grooves 68 and pushes the inner walls of the guide grooves 68, and rotates the button 44 around the shaft 42.

Here, as described above, the button 44 is urged by the torsion coil spring 48 in the direction of entering into the attachment hole 30. The button 44, to which this urging force is applied, pushes the pushing portion 98 around the shaft 54 and against the detent rod 14.

However, as described above, the detent rod 14 is urged toward the upper side of the lever main body 12 by the urging force of the compression coil spring 15. Accordingly, the detent rod 14 attempts to push the pushing portion 98 upward.

Namely, in the present embodiment, the urging force of the compression coil spring 15 is applied so as to counter the urging force of the torsion coil spring 48. Here, in the present embodiment, the spring constant of the compression coil spring 15 is larger than the spring constant of the torsion coil spring 48.

Therefore, in the state in which external force in the same direction as the urging force of the torsion coil spring 48, i.e., in the direction of pushing the button 44 toward the inner side of the attachment hole 30, is not applied to the button 44 additionally to the urging force of the torsion coil spring 48, the detent rod 14 which is urged by the compression coil spring 15 pushes the pushing portion 98 upward and pushes the button 44 out toward the outer side of the attachment hole 30.

Between the longitudinal direction one ends and both ends thereof, the guide grooves 68 are curved at a predetermined curvature around a predetermined region at the attachment hole 30 side.

The holder 32, to which the button 44 and the link member 56 are mounted, is inserted and fit into the knob 16 from the attachment hole 30. Due to an elastic fit-together piece 70, which is formed at the top wall 36, fitting-together with a fit-together hole 72 formed in the holding portion 22, the holder 32 is prevented from being pulled out to the outer side of the attachment hole 30, and is attached to the knob 16.

<Operation And Effects Of Present Embodiment>

Next, the operation and effects of the present embodiment will be described.

When, in the state in which the knob 16 is grasped, the present shift lever 10 is rotated around the shaft-supporting portion at the proximal end side thereof and reaches a preset rotational position (shift position), the rotational position of the lever main body 12 is detected by a position detecting device such as a microswitch, or a magnetic sensor like a Hall element, or the like provided at the housing. An electric signal, which corresponds to the results of detection of the rotational position of the lever main body 12 by the position detecting device, is inputted to an ECU which controls the automatic transmission. The shift range of the automatic transmission is changed at the ECU in accordance with the inputted electric signal (i.e., the results of detection of the rotational position of the lever main body 12).

Further, for example, in the state in which the lever main body 12 has reached a shift position corresponding to the neutral range which cuts off the transmission of the driving force of the engine to the wheels (hereinafter, this shift position is called the "N position" for convenience), the projecting portions formed at the detent holes are positioned on the locus of rotation of the detent pins 17 at the time of rotating the lever main body 12 from the N position to a shift position corresponding to a reverse range at which the driving force of the engine is transmitted to the wheels and moves the vehicle rearward (hereinafter, this shift position is called the "R position" for convenience), and the projecting portions oppose the detent pins 17.

In this state, when an attempt is made to merely rotate the lever main body 12 toward the R position, the projecting portions of the detent holes abut the detent pins 17, and restrict rotation of the detent pins 17. Due to the rotation of the detent pins 17 being restricted in this way, rotation of the lever main body 12 toward the R position is restricted. In this way, the lever main body 12 can be prevented from inadvertently rotating from the N position to the R position.

On the other hand, in the state in which the lever main body 12 has reached the N position as described above, when the button 44 provided at the knob 16 is pushed and the button 44 is rotated around the shaft 42, as shown in FIG. 7, the lower end side of the button 44 moves toward the inner side of the knob 16. When the button 44 rotates in this way, the inner walls of the guide grooves 68 rotate together with the button 44 and push the outer peripheral portion of the engaging pin 64 in the rotational direction of the button 44.

However, the engaging pin 64 is, at the longitudinal direction intermediate portion thereof, integrally connected to the both side walls 58 of the link member 56. Further, the link member 56, to which the engaging pin 64 is connected, is supported at the shaft 54. The movement of the engaging pin 64 is thereby restricted to rotation around the shaft 54. Accordingly, the engaging pin 64, which receives the pushing force from the inner walls of the guide grooves 68, rotates in one direction around the shaft 54 (rotates right in FIGS. 4 and 7) together with the link member 56.

When the link member 56 rotates in one direction around the shaft 54 in this way, the pushing portion 98 provided at the link member 56 pushes the distal end portion of the detent rod 14 against the urging force of the compression coil spring 15 provided within the lever main body 12, and lowers (moves) the detent rod 14 toward the proximal end side of the lever main body 12.

Due to the detent rod 14 being lowered in this way, the detent pins 17 which are integral with the detent rod 14 fall. The state in which the projecting portions of the detent holes and the detent pins 17 oppose one another along the direction of rotation of the detent pins 17 at the time when the lever main body 12 is rotated from the N position to the R position, is thereby cancelled.

Accordingly, even if the lever main body 12 is rotated from the N position to the R position in this state, the detent pins 17 avoid the projecting portions of the detent holes and rotates. Therefore, the lever main body 12 can rotate from the N position to the R position, and the shift range of the automatic transmission can be changed to the reverse range.

In the present shift lever 10, due to the inner walls of the guide grooves 68 pushing the outer peripheral portion of the engaging pin 64 as described above, the engaging pin 64 rotates around the shaft 54 together with the link member 56. The pushing force at the time when the inner walls of the guide grooves 68 push the outer peripheral portion of the engaging pin 64, is orthogonal to the direction of the tangent line at the regions where the pushing force from the inner walls of the guide grooves 68 is applied to the engaging pin 64, i.e., the regions of contact of the inner walls of the guide grooves 68 and the outer peripheral portion of the engaging pin 64, and is directed toward the axial center of the engaging pin 64.

This pushing force is divided into a component of force in the horizontal direction shown in FIGS. 4, 6, and 7 (i.e., a component of force directed toward the inner side of the knob 16 along the direction of opening of the attachment hole 30) and a component of force in the vertical direction (i.e., a component of force directed upwardly in the pass-through direction of the tubular portion 20). The component of force which contributes to the rotation of the link member 56 is the component of force in the horizontal direction. Accordingly, the smaller the increase and decrease in the horizontal direction component of force of the pushing force which the inner walls of the guide grooves 68 apply to the engaging pin 64, the more the magnitude of the force applied to the button 44 can be maintained constant.

Here, in the present embodiment, the guide grooves 68 are curved at a predetermined curvature around a predetermined region at the attachment hole 30 side, from one longitudinal direction ends to the other longitudinal direction ends of the guide grooves 68 as described above. In this way, even when the guide grooves 68 rotate as the button 44 rotates, the tangent line direction at the regions of contact between the inner walls of the guide grooves 68 and the outer peripheral portion of the engaging pin 64 either does not change, or the rate of change in the orientation of the tangent line direction is small.

Therefore, the change in the ratio of the vertical direction component of force and the horizontal direction component of force of the pushing force which the inner walls of the guide grooves 68 apply to the engaging pin 64 can be made to be small. In this way, the force needed at the time of rotating the button 44 can be made to have a substantially constant magnitude from the beginning to the end of the pushing of the button 44.

Moreover, in the present embodiment, as described above, it suffices to merely curve the guide grooves 68, and there is no need to greatly vary the distance from the shaft 42, which is the axial center of rotation of the button 44, to the regions of contact between the engaging pin 64 and the inner walls of the guide grooves 68. Therefore, the knob 16 can be prevented from becoming large.

Even if the guide grooves 68 have heretofore had a rectilinear design, the above-described effects are obtained merely by curving the guide grooves 68. Therefore, application to conventional shift levers 10 is easy, and because no great design change is required, the shift lever 10 can be realized at a low cost.

On the other hand, as described above, when the engaging pin 64 rotates in one direction (toward the right in FIGS. 4, 6, and 7) around the shaft 54 together with the link member 56 and the link member 56 rotates in one direction around the shaft 54, the distal end of the link member 56, at which the cover portion 90 is provided, approaches the upper end of the tubular portion 20. Further, when the pushing portion 98 lowers the detent rod 14 against the urging force of the compression coil spring 15 until the state in which the projecting portions of the detent holes and the detent pins 17 oppose one another along the direction of rotation of the detent pins 17 at the time when the lever main body 12 is rotated from the N position to the R position is cancelled, the top end surface of the tubular portion 20 and the distal end of the pushing portion 98 approximately oppose one another in the direction of opening of the upper end opening portion of the tubular portion 20.

However, as described above, the abutting portion 100 is provided at the top end surface of the tubular portion 20 so as to correspond to the distal end of the pushing portion 98. When the distal end of the link member 56 at the side at which the cover portion 90 is provided is rotated in the direction of approaching the top end surface of the tubular portion 20, the pushing portion 98 abuts the abutting portion 100 as shown in FIG. 6.

The top wall 102 of the abutting portion 100 is, via the vertical walls 104, supported at the top end surface of the tubular portion 20. Therefore, the pushing portion 98, and accordingly the link member 56, are interfered with by the top end surface of the tubular portion 20 via the abutting portion 100, and further rotation of the link member 56 is restricted by the top end surface of the tubular portion 20.

Here, in the present embodiment, the pushing portion 98 is a portion of the cover portion 90, and is formed of a rubber material or a synthetic resin material having the same degree of elasticity as a rubber material. Therefore, the impact at the time when the pushing portion 98 abuts the abutting portion 100 due to the rotation of the link member 56 is absorbed by the elastic deformation of the pushing portion 98, and accordingly the cover portion 90 itself. In this way, the occurrence of an impact noise or the like caused by the impact at the time when the pushing portion 98 abuts the abutting portion 100, can be effectively suppressed or prevented.

Further, as described above, the projecting portion 108 is formed at the top wall 102 of the abutting portion 100. Therefore, as shown in FIG. 6, at the time when the pushing portion 98 abuts the abutting portion 100 due to the rotation of the link member 56 as described above, first, the pushing portion 98 abuts the projecting portion 108.

Here, the dimension of the projecting portion 108 along the transverse direction of the top wall 102 is sufficiently smaller than the widthwise dimension of the top wall 102. Therefore, as compared with a case in which the projecting portion 108 were not provided and the pushing portion 98 were to directly abut the top wall 102, the surface area of contact with the pushing portion 98 can be made to be smaller in the present embodiment in which the projecting portion 108 is provided.

In this way, at the initial stage of the abutting of the pushing portion 98, by making the surface area of contact with the pushing portion 98 small, an impact sound caused by the impact at the time when the pushing portion 98 abuts the abutting portion 100 can be effectively mitigated or prevented.

Moreover, due to further rotation of the link member 56, the pushing portion 98 which abuts the projecting portion 108 as described above pushes the projecting portion 108, elastically deforms the projecting portion 108, and abuts the top wall 102, as shown in FIG. 7. Here, after the pushing portion 98 abuts the projecting portion 108 and until the pushing portion 98 abuts the top wall 102, the speed of rotation of the link member 56 is slowed due to the elasticity of the projecting portion 108.

Due to the rotational speed of the pushing portion 98 at the time of abutting the top wall 102 being decelerated in this way, the impact at the time when the pushing portion 98 abuts the top wall 102 can be decreased. Further, because the top wall 102 elastically deforms at the time when the pushing portion 98 abuts the top wall 102, the impact at the time when the pushing portion 98 abuts the top wall 102 is absorbed by the top wall 102.

Moreover, because the void portion 106 is formed between the top wall 102 and the top end of the tubular portion 20, it is difficult for the impact, which the top wall 102 receives from the pushing portion 98, to be transferred to the top end of the tubular portion 20. Therefore, the impact sound generated at the time when the pushing portion 98 abuts the top wall 102 can be mitigated, or the occurrence of such an impact sound can be prevented.

On the other hand, when the pushing force applied to the button 44 is cancelled, the detent rod 14 which is urged by the compression coil spring 15 pushes-up the pushing portion 98. In this way, when the link member 56 rotates around the shaft 54, the engaging pin 64 pushes the inner walls of the guide grooves 68, and rotates the button 44 around the shaft 42 against the urging force of the torsion coil spring 48. In this way, the button 44 is pushed-out toward the outer side of the attachment hole 30.

Here, when the link member 56 rotates as described above, the connecting wall 60 of the link member 56 approaches the lower end portion of a vertical wall 80. When the connecting wall 60 of the link member 56 approaches the lower end portion of the vertical wall 80 by a predetermined distance, as shown in FIG. 4, the abutting portion 94 structuring the cover portion 90 abuts the lower end portion of the vertical wall 80.

Due to the abutting portion 94 abutting the lower end portion of the vertical wall 80 in this way, the connecting wall 60 of the link member 56 is interfered with by the lower end portion of the vertical wall 80, via the main body portion 92, the cavity portion 96, and the abutting portion 94 of the cover portion 90. In this way, further rotation of the link member 56 due to the urging force of the torsion coil spring 48 is restricted, and accordingly, rotation of the button 44 is restricted.

Here, the cover portion 90 is formed of a rubber material or a synthetic resin material having elasticity of the same level as a rubber material. Therefore, due to the pushing reaction force at the time when the abutting portion 94 abuts and pushes the lower end portion of the vertical wall 80, the abutting portion 94 elastically deforms. Due to this elastic deformation of the abutting portion 94, the impact at the time when the abutting portion 94 abuts the lower end portion of the vertical wall 80 is absorbed. In this way, the impact noise caused due to this impact can be mitigated, or the generation of an impact noise can be prevented.

By forming the abutting portion 94 apart from the main body portion 92 of the cover portion 90, the cavity portion 96 which is hollow is formed between the main body portion 92 and the abutting portion 94. Accordingly, in the state in which the abutting portion 94 abuts the lower end portion of the vertical wall 80, the cavity portion 96 exists between the connecting wall 60 and the lower end portion of the abutting portion 94, and it is difficult for the impact at the time when the abutting portion 94 abuts the lower end portion of the vertical wall 80 to be transmitted to the connecting wall 60. For this reason as well, the impact sound arising at the time of the aforementioned impact can be mitigated, or the generation of an impact sound can be prevented.

The main body portion 92 of the cover portion 90 as well is formed of a rubber material or a synthetic resin material having elasticity of the same degree as a rubber material. Therefore, even if the impact at the time when the abutting portion 94 abuts the lower end portion of the vertical wall 80 were to be transmitted to the main body portion 92, the impact would be absorbed by the elasticity of the main body portion 92. Accordingly, for this reason as well, the impact sound caused by the aforementioned impact can be mitigated, or the generation of an impact sound can be prevented.

In this way, in the present embodiment, when rotation of the link member 56 is restricted by the top end of the tubular portion 20 or the lower end portion of the vertical wall 80, the impact is absorbed or the propagation of the impact is impeded. Therefore, as described above, the generation of impact noise can very effectively be mitigated or prevented, and the quietness at the time when the button 44 is pressed and operated can be improved effectively.

Further, because the impact can be absorbed in this way, at the time of operating the button 44, it is possible to effectively mitigate or prevent impact from being transmitted to the finger or the like which is pushing the button 44, and the feel of operation at the time of pushing and operating the button 44 can be improved.

Moreover, in the present embodiment, as described above, the urging force of the torsion coil spring 48, which urges the link member 56 via the button 44, counters the urging force of the compression coil spring 15 which pushes the pushing portion 98 (i.e., the link member 56) via the link member 56 via the detent rod 14.

Therefore, due to the urging force of the torsion coil spring 48, the pushing portion 98 of the link member 56 is always press-contacted by the urging force of the detent rod 14. In this way, the pushing portion 98 does not collide with the distal end of the detent rod 14 due to the link member 56 rotating.

On the other hand, by reversing the direction of urging the button 44 by the torsion coil spring 48, the upper end of the detent rod 14 and the pushing portion 98 can be kept separated from one another, in the state in which the link member 56 rotates until the abutting portion 94 abuts the lower end of the vertical wall 80.

Even with such a structure, the pushing portion 98, which is a portion of the cover portion 90, is of course formed of a rubber material or a synthetic resin material having elasticity of the same extent as a rubber material. Therefore, even if the pushing portion 98 were to approach and abut the top end of the detent rod 14, the impact at the time of abutment would be absorbed by the elastic deformation of the pushing portion 98. Accordingly, the generation of impact noise due to such an impact can be effectively mitigated or prevented.

As described above, the present embodiment is structured such that the abutting portion 100 is provided at the top end surface of the tubular portion 20 in correspondence with the distal end of the pushing portion 98. Here, in the present embodiment, the abutting portion 100 is formed of a synthetic resin material which is the same material as the cover portion 28, and the abutting portion 100 which extends from the cover portion 28 passes through the communicating portions 110, 112 and is provided at the top end surface of the tubular portion 20. Therefore, for example, in the case of employing a method of molding (so-called insert molding) in which the base 18 which is molded in advance is disposed within a mold for molding the cover portion 28, and a predetermined range of the outer surface of the base 18 is covered by the cover portion 28 while molding the cover portion 28 by filling the synthetic resin material into the mold, the abutting portion 100 can be provided at the region corresponding to the distal end side of the pushing portion 98 while the abutting portion 100 is molded together with the cover portion 28.

On the other hand, when the cover portion 28 is attached to the base 18 in a structure in which the base 18 and the cover portion 28 are formed as separate members, the abutting portion 100 can be provided at the region corresponding to the distal end side of the pushing portion 98 by attaching the cover portion 28 to the base 18.

In this way, in the present embodiment, the abutting portion 100 can be provided at the region corresponding to the distal end side of the pushing portion 98, merely by providing the cover portion 28 at the base 18. Therefore, there is substantially no need for a process for attaching (a process for assembling) the abutting portion 100. In this way, the number of work processes needed for assembling the shift lever 10 can be reduced.

Moreover, because the cover portion 28 and the abutting portion 100 are formed integrally of the same material, the abutting portion 100 can substantially be formed as a portion of the cover portion 28. In this way, an increase in the number of parts can be suppressed, and an increase in the cost of the parts can be suppressed.

In the present embodiment, as described above, both the button 44 and the link member 56 rotate. However, from the standpoint of the present invention recited in the claims, the form of the movement of the button 44 and the link member 56 is not limited to rotation, and may be rectilinear displacement.

Further, in the present embodiment, the operation member is the link member 56, but, from the standpoint of the present invention recited in the claims, the operation member is not limited to the link member 56. Namely, the button 44 can be interpreted as the operation member, for example, in a case in which the detent rod 14 is directly pressed by the button 44 without providing the link member 56, or in a case in which an intermediate member such as the link member 56 is provided, and the button 44 is provided so as to be away from the intermediate member, and the button 44 which moves abuts the intermediate member and moves the intermediate member, or the like.

Moreover, in the present embodiment, the change in the direction of the tangent line, at the regions of contact between the inner walls of the guide grooves 68 and the outer peripheral portion of the engaging pin 64, due to the rotation of the button 44 is suppressed. However, the present invention is not limited to such a structure of suppressing changes in the direction of the tangent line.

For example, the torsion coil spring 48 and the compression coil spring 15 and the like have the characteristic that, the greater the amount of change in the shape thereof, the more the urging force increases. Namely, in terms of the present embodiment, if the button 44 is pushed and rotated, the urging force of the torsion coil spring 48 increases, and when the detent rod 14 is lowered, the urging force of the compression coil spring 15 increases.

Taking this increase and decrease in the urging forces of the urging members into consideration as well, a structure is possible in which, as the button 44 is pushed and rotated, the tilting of the aforementioned tangent line direction in the vertical direction with respect to the horizontal direction increases, and the horizontal direction component of force of the pushing force which the inner walls of the guide grooves 68 apply to the outer peripheral portion of the engaging pin 64 increases.

The present embodiment is structured such that the guide grooves 68 are formed at the button 44, and the engaging pin 64 is provided at the link member 56. However, a structure is possible in which the guide grooves 68 are provided at the link member 56 and the engaging pin 64 is provided at the button 44.

In the present embodiment, the rotational position of the lever main body 12 is detected by a position detecting device such as a microswitch, or a magnetic sensor like a Hall element, or the like. However, the structure which detects the rotational position of the lever main body 12 is not limited to such a position detecting device.

For example, a structure such as the following may be used: a connecting member, such as a wire or a cable or the like whose portion of connection with the lever main body 12 is displaced as the lever main body 12 rotates, is provided. The lever main body 12 is connected either directly or indirectly to the automatic transmission via this connecting member. The rotational position of the lever main body 12 is detected at the automatic transmission on the basis of the direction of displacement and the amount of displacement of the connecting member.

Namely, a first aspect of the present invention is a shift lever comprising: a lever main body which is hollow and which can rotate around one of a longitudinal direction intermediate portion thereof and a proximal end side thereof; a moving body provided within the lever main body so as to be movable along a longitudinal direction of the lever main body; a knob graspably mounted to a distal end portion of the lever main body, an attachment hole, which communicates with an interior of the lever main body, being formed in the knob; an operation member at least a portion of which is mounted one of directly and indirectly to the knob so as to be reciprocatingly movable at an inner side of the attachment hole, and due to the operation member moving in a going direction toward an inner side of the knob, the operation member abuts the moving body and moves the moving body toward a longitudinal direction proximal end side of the lever main body, and due to the operation member moving a predetermined amount in at least one direction of the reciprocal movement, a predetermined region of the knob interferes with the operation member such that movement of the operation member in that moving direction is restricted; and an elastic member provided at at least one of the operation member and the predetermined region, and in a state in which the predetermined region interferes with the operation member, the elastic member exists between the operation member and the predetermined region and elastically deforms.

In accordance with the shift lever relating to the first aspect of the present invention, the knob is mounted to the distal end portion of the lever main body. When the knob is grasped and the lever main body is moved to a predetermined shift position, the transmission of the vehicle is changed to a shift range and gears corresponding to the shift position of the lever main body (i.e., the present shift lever).

Further, at the shift lever relating to the first aspect of the present invention, at least a portion of the operation member is mounted so as to be reciprocatingly movable in a state in which it is positioned at the inner side of the attachment hole formed in the knob. When the operation member is moved in the going direction, the moving body accommodated within the lever main body is moved toward the longitudinal direction proximal end side of the lever main body. If the moving body is a member called a detent rod or the like, due to the detent rod moving as described above, the restricting of the movement of the lever main body is cancelled, and the lever main body can be moved to the desired shift position.

When the operation member moves a predetermined amount in at least one direction of the reciprocal movement as described above, a predetermined region of the knob interferes with the operation member either directly or indirectly via another member. In this way, further movement of the operation member is restricted. Namely, the predetermined region of the knob interfering with the operation member works as a stopper of the operation member. For example, if the movement in the going direction of the operation member is restricted, the application of pushing force which is greater than needed to the moving body, or the like, can be prevented. If the movement in the return direction of the operation member is restricted, the operation member can be prevented from falling out, or the like.

Here, in the shift lever relating to the first aspect of the present invention, an elastic member is provided at at least one of the operation member and the predetermined region of the knob. At the time when the operation member moves and the predetermined region of the knob interferes with the operation member, the elastic member exists between the operation member and the predetermined region of the knob.

The elastic member, which exists between the operation member and the predetermined region of the knob in this way, is elastically deformed due to the impact at the time when the predetermined region of the knob interferes with the operation member. Due to the elastic deformation of the elastic member, the impact at the time when the predetermined region of the knob interferes with the operation member is absorbed.

In this way, impact noise or the like at the time when the predetermined region of the knob interferes with the operation member is mitigated, or the generation of such an impact noise is prevented.

Note that the first aspect of the present invention may be structured such that the operation member directly applies force, such as pushing force or the like, to the moving body (i.e., a structure in which the moving body abuts the operation member), or may be a structure in which the operation member applies force, such as pushing force or the like, to the moving body indirectly via another member.

The shift lever of the first aspect of the present invention may be structured such that the knob has a knob main body in which the attachment hole is formed, and a holder which is attached to the attachment hole and to which a button, which is movable into and out of the attachment hole, is mounted, the operation member has a link which is mounted so as to be reciprocatingly movable within the holder, the link moving in the going direction by interlocking with movement of the button inwardly, and the holder interfering with the link due to the link moving a predetermined amount in at least one direction of the reciprocal movement, and the elastic member is provided at at least one of the link and the holder.

In accordance with the shift lever of the above-described structure, the attachment hole is formed in the knob main body which structures the knob. The holder, which, together with the knob main body, structures the knob, is attached in the attachment hole of the knob main body. The button for operation is mounted to the holder so as to be able to move into and out of the attachment hole. The link, which serves as the operation member, is mounted to the holder so as to be reciprocatingly movable.

When the button moves toward the inner side, the link, which can move reciprocatingly, moves in the going direction interlockingly with the movement of the button. Due to this movement of the link in the going direction, the moving body is moved toward the longitudinal direction proximal end side of the lever main body.

Further, when the link moves a predetermined amount in at least one direction of the reciprocal movement, the link is interfered with by the holder, which, by being attached in the attachment hole of the knob main body, is considered to be a portion of the knob.

In the shift lever of the above-described structure, the elastic member is provided at at least one of the link member and the holder. The elastic member exists between the link and the holder at the time when the link moves and is interfered with by the holder as described above.

Accordingly, due to the elastic member elastically deforming due to the impact at the time when the holder interferes with the link, this impact is absorbed.

In this way, impact noise or the like at the time when the holder interferes with the link is mitigated, or the generation of such impact noise is prevented.

In the shift lever of the first aspect of the invention, the elastic member may have a void portion.

In accordance with the shift lever having this structure, the elastic member exists between the operation member and the predetermined region of the knob, in the state in which the operation member moves a predetermined amount and the predetermined region of the knob interferes with the operation member. Moreover, the void portion, which is formed at the elastic member, exists between the operation member and the predetermined region of the knob in the state in which the predetermined region of the knob interferes with the operation member as described above.

Accordingly, at the elastic member, the elasticity along the direction in which the operation member and the predetermined region of the knob oppose one another at the time when the predetermined region of the knob interferes with the operation member is great. The elastic member elastically deforms easily due to the impact at the time when the predetermined region of the knob interferes with the operation member.

Therefore, impact noise or the like at the time when the predetermined region of the knob interferes with the operation member is mitigated even more effectively, or the generation of such an impact noise is prevented even more effectively.

The shift lever of the first aspect of the present invention may be structured such that the elastic member has an elastic member main body mounted to one of the operation member and the predetermined region, and a projecting portion formed to project from the elastic member main body, and a distal end of the projecting portion abuts another of the operation member and the predetermined region in the state in which the predetermined region interferes with the operation member.

In accordance with the shift lever of the above-described structure, the projecting portion is formed to project from the elastic member main body which is provided at one of the operation member and the predetermined region of the knob. When the predetermined region of the knob interferes with the operation member, the distal end of the projecting portion abuts the other of the operation member and the predetermined region of the knob.

In this way, when the operation member or the predetermined region of the knob abuts the distal end of the projecting portion, the projecting portion elastically deforms due to the pushing force from the operation member or the pushing reaction force from the predetermined region of the knob. Due to the projecting portion elastically deforming in this way, the operation member or the predetermined region of the knob (i.e., the other of the one of the operation member and the predetermined region of the knob at which the elastic member main body is provided) abuts the elastic member main body.

The surface area of the distal end of the projecting portion is smaller than the surface area of the portion of interference of the operation member and the predetermined region of the knob in the aforementioned state of interference in a case in which the projecting portion is not provided. Therefore, the surface area of abutment at the time when the operation member or the predetermined region of the knob abuts the projecting portion is smaller than the surface area of abutment in a case in which the operation member and the predetermined region of the knob abut. In this way, the impact at the time when the operation member or the predetermined region of the knob abuts the projecting portion is smaller, and the impact noise or the like can be mitigated, or the generation of impact noise or the like can be prevented.

Further, after the operation member or the predetermined region of the knob abuts the distal end of the projecting portion, as described above, the projecting portion is elastically deformed due to the pushing force from the operation member or the pushing reaction force from the predetermined region of the knob, and the operation member or the predetermined region of the knob abuts the elastic member main body. Here, the impact is mitigated due to the projecting portion elastically deforming, and in addition, the speed of the operation member or the predetermined region of the knob approaching the elastic member main body is slowed. Therefore, the impact at the time when the operation member or the predetermined region of the knob abuts the elastic member main body is effectively reduced, and for this reason as well, the impact noise or the like can be mitigated, or the generation of impact noise or the like can be prevented.

Moreover, the elastic member main body itself elastically deforms by abutting the operation member or the predetermined region of the knob. Therefore, of course, for this reason as well, the impact noise or the like can be mitigated, or the generation of impact noise or the like can be prevented.

The shift lever of the first aspect of the present invention may further comprise: a first urging member urging the operation member in the going direction; and a second urging member urging the moving body toward a longitudinal direction distal end side of the lever main body by an urging force which is greater than an urging force of the first urging member.

In accordance with the shift lever of the above-described structure, the moving body is urged by the second urging member toward the longitudinal direction distal end side. Accordingly, when the moving body is moved toward the longitudinal direction proximal end side of the lever main body, the operation member is moved in the going direction against the urging force of the second urging member.

Further, the operation member is urged in the going direction by the first urging member, and the urging force of the second urging member is greater than the urging force of the first urging member. Therefore, if the external force, which is applied to the operation member separately from the urging force of the first urging member in order to move the operation member in the going direction, is cancelled, the moving body which is urged by the second urging member moves the operation member in the return direction against the urging force of the first urging member.

Here, as described above, the direction of urging of the first urging member counters the direction of urging of the second urging member. Therefore, the operation member urged by the first urging member always abuts the moving body.

If the operation member and the moving body are set apart from one another, a collision arises at the time when the operation member approaches and abuts the moving body.

However, in the shift lever of the above-described structure, the operation member always abuts the moving body as described above. Therefore, the operation member and the moving body do not collide at the time when the operation member is operated to move in the going direction, or at the time when the moving body moves toward the longitudinal direction distal end side of the lever main body.

In this way, in the shift lever of the first aspect of the present invention, the generation of impact noise or the like, which is caused due to a collision between the operation member and the moving body, can be prevented.

The shift lever of the first aspect of the present invention may be structured such that a connecting portion, which connects the knob and the predetermined region, is formed at the knob, and an outer surface of the knob, the connecting portion, and the predetermined region are formed by the elastic member of the same material.

In accordance with the shift lever having this structure, the outer surface of the knob is covered by a cover portion which is an elastic member. In this way, the tactile sensation and the like at the time of grasping the knob improve, and the external appearance of the knob also improves.

Here, in the shift lever in accordance with this structure, the interior and exterior of the knob are connected by the connecting portion which is formed in a vicinity of the portion where the knob interferes with the operation member which moves. The elastic member, which is formed continuously from the cover portion, passes over the connecting portion, and the elastic member is provided at the portion where the knob interferes with the operation member.

In this way, in the shift lever in accordance with this structure, the elastic member is formed continuously from the cover portion. Therefore, for example, in a case of employing a method of molding in which the knob which is molded in advance is disposed within a mold for molding the cover portion, and the outer surface of the knob is covered by the cover portion while molding the cover portion by filling a synthetic resin material into the mold, the elastic member is provided at the portion interfering with the operation member while the elastic member is molded together with the cover portion.

On the other hand, when attaching the cover portion to the knob in a structure in which the knob and the cover portion are formed in advance as separate bodies, the elastic member is provided at the portion which interferes with the operation member by attaching the cover portion to the knob.

Accordingly, in the shift lever of this structure, placement of the elastic member at the region which interferes with the operation member is completed merely by providing the cover portion at the knob. Therefore, a step of attaching (a step of assembling) the elastic member is substantially unnecessary. Accordingly, the number of work processes needed for assembling the shift lever can be reduced.

Further, because the cover portion and the elastic member are formed integrally of the same material, the elastic member can substantially be formed as a portion of the cover portion. In this way, an increase in the number of parts can be suppressed, and an increase in the cost of the parts can be suppressed.

As described above, in the shift lever relating to the present invention, the generation of impact noise or the like at the time when the operation member moves reciprocatingly can be effectively prevented or mitigated, and the quietness can be improved. Moreover, it is possible to effectively reduce or prevent the impact, at the time when the operation member moves reciprocatingly, from being transmitted to the hand or the like which is grasping the knob. In this way, the operational feel can be improved.

What is claimed is:

1. A shift lever comprising:
   a lever main body which is hollow and which can rotate around one of a longitudinal direction intermediate portion thereof and a proximal end side thereof;
   a moving body provided within the lever main body so as to be movable along a longitudinal direction of the lever main body;
   a knob graspably mounted to a distal end portion of the lever main body, an attachment hole, which communicates with an interior of the lever main body, being formed in the knob;
   an operation member at least a portion of which is mounted one of directly and indirectly to the knob so as to be reciprocatingly movable at an inner side of the attachment hole, and due to the operation member moving in a going direction toward an inner side of the knob, the operation member abuts the moving body and moves the moving body toward a longitudinal direction proximal end side of the lever main body, and due to the operation member moving a predetermined amount in at least one direction of the reciprocal movement, the operation member impacts a predetermined region of the knob that interferes with the operation member such that movement of the operation member in said going direction is stopped; and
   an elastic member provided at at least one of the operation member and the predetermined region, and in a state in which the predetermined region interferes with the operation member, the elastic member is present between the operation member and the predetermined region and elastically deforms when said operation member impacts said predetermined region of the knob such that impact noise is prevented.

2. The shift lever of claim 1, wherein the knob has a knob main body in which the attachment hole is formed, and a holder which is attached to the attachment hole and to which a button, which is movable into and out of the attachment hole, is mounted,
   the operation member has a link which is mounted so as to be reciprocatingly movable within the holder, the link moving in the going direction by interlocking with movement of the button inwardly, and the holder impacting the link due to the link moving a predetermined amount in at least one direction of the reciprocal movement, and
   the elastic member is provided at at least one of the link and the holder such that impact noise is prevented when said operation member impacts said predetermined region of the knob.

3. The shift lever of claim 1, wherein the elastic member has a void portion.

4. The shift lever of claim 1, wherein the elastic member has an elastic member main body mounted to the predetermined region, and a projecting portion formed to project from the elastic member main body, and a distal end of the projecting portion abuts the operation member in the state in which the predetermined region interferes with the operation member.

5. The shift lever of claim 1, further comprising:
   a first urging member urging the operation member in the going direction; and
   a second urging member urging the moving body toward a longitudinal direction distal end side of the lever main body by an urging force which is greater than an urging force of the first urging member.

6. The shift lever of claim 5, wherein the knob has a knob main body in which the attachment hole is formed, and a holder which is attached to the attachment hole and to which a button, which is moveable into and out of the attachment hole, is mounted, and
   the first urging member includes a torsion coil spring which moves the operation member reciprocatingly via the button.

7. The shift lever of claim 5, wherein the second urging member includes a compression coil spring.

8. The shift lever of claim 1, wherein a connecting portion, which connects the knob and the predetermined region, is formed at the knob, and
   an outer surface of the knob, the connecting portion, and the predetermined region are formed by a same elastic material.

9. The shift lever of claim 1, wherein the elastic member is further provided at a region of the operation member, at which region the operation member abuts the moving body.

10. The shift lever of claim 1, wherein the elastic member is provided at both the operation member and the predetermined region which region interferes due to movement of the operation member in the going direction.

11. The shift lever of claim 1, wherein the elastic member has an elasticity of the same level as a rubber material and is provided at a region of the operation member which region interferes with the knob due to movement in the going direction, and at a region of the operation member which region interferes with the knob due to movement in a return direction.

12. The shift lever of claim 1, wherein the elastic member is provided at a region of the knob which region interferes due to movement of the operation member in the going direction.

13. The shift lever of claim 1, wherein the elastic member includes rubber.

14. The shift lever of claim 1, wherein the elastic member includes a synthetic resin.

* * * * *